(12) United States Patent
Otsuka

(10) Patent No.: US 6,506,442 B2
(45) Date of Patent: Jan. 14, 2003

(54) METHOD FOR PRODUCING MAGNETIC RECORDING MEDIUM

(75) Inventor: Hitoshi Otsuka, Tochigi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/764,100

(22) Filed: Jan. 19, 2001

(65) Prior Publication Data

US 2002/0098280 A1 Jul. 25, 2002

(51) Int. Cl.[7] .................................................. B05D 5/12
(52) U.S. Cl. ........................ 427/129; 427/128; 427/130; 427/299; 427/316; 427/322
(58) Field of Search ................................ 427/128, 129, 427/130, 299, 316, 322

(56) References Cited

U.S. PATENT DOCUMENTS 4,183,819 A * 1/1980 Stolove ...................... 252/144
4,577,362 A 3/1986 Tanaka et al.
4,887,623 A 12/1989 Sugiyama et al.
4,944,808 A 7/1990 Sugiyama et al.

FOREIGN PATENT DOCUMENTS

| JP | A-59-150571 | 8/1984 |
| JP | A-62-60749 | 3/1987 |

* cited by examiner

Primary Examiner—Bernard Pianalto
(74) Attorney, Agent, or Firm—Sughrue Mion, PLLC

(57) ABSTRACT

A method for producing a magnetic recording medium having a magnetic material coated on a surface of a polymeric film comprising, in the running direction of the polymeric film, the steps of pressing a cleaning tape made of one of a non-woven fabric and a fabric impregnated with a cleaning agent against the surface of said polymeric film onto which said coating material is coated in order to wipe off foreign matter adhering to said surface of the polymeric film; drying the surface of the wiped polymeric film; and just after the drying step, coating a magnetic coating material onto a surface of a polymeric film while said polymeric film is running. An apparatus for the above method is also disclosed.

10 Claims, 2 Drawing Sheets

METHOD FOR PRODUCING MAGNETIC RECORDING MEDIUM

BACKGROUND OF THE INVENTION

1. Field of the Invention

The present invention relates to a method for producing a magnetic recording medium and an apparatus for implementing the method.

2. Description of the Related Art

During the production of a magnetic recording medium, the surface of a polymeric film on which a magnetic coating material is to be coated is customarily cleaned prior to coating in order to improve the error ratio of high-density recording in the finished product.

Known examples of a cleaning method for a polymeric film include a method of blowing cleaning air at a high speed onto the surface of the polymeric film while the film is running on a back-up roll in order to separate foreign matter from the surface of the polymeric film and to blow it towards a suction duct located adjacent the surface of film, and a method of supplying a cleaning agent to the surface of the polymeric film and removing both the foreign matter and the cleaning agent with one or more doctor blades.

However, the method of blowing cleaning air onto the surface of the polymeric film cannot always successfully remove foreign matter strongly adhering to the surface of the film. Also, the method of removing foreign matter with doctor blades has a tendency to scratch the surface of the film, thus making impossible consistently to obtain a good quality coated film.

SUMMARY OF THE INVENTION

An object of this invention is thus to reliably remove foreign matter adhering to the surface of a polymeric film without damaging the surface of the polymeric film.

In accordance with the above and other objects, a first aspect of the present invention relates to a method for producing a magnetic recording medium having a magnetic material coated on a surface of a polymeric film comprising, in the running direction of the polymeric film, the steps of:

pressing a cleaning tape made of one of a non-woven fabric and a fabric impregnated with a cleaning agent against the surface of said polymeric film onto which said coating material is coated in order to wipe off foreign matter adhering to said surface of the polymeric film;

drying the surface of the wiped polymeric film; and just after the drying step, coating a magnetic coating material onto a surface of a polymeric film while said polymeric film is running.

In the present invention "the running direction of the polymeric film" means from upstream to downstream of the running polymeric film. In the present invention a magnetic material may be coated as an upper layer together with a magnetic or non-magnetic intermediate layer as a lower layer simultaneously onto a surface of a polymeric film.

A second aspect of the present invention relates to an apparatus for producing a magnetic recording medium having a magnetic material coated on a surface of a polymeric film comprising, in the running direction of the polymeric film:

a wiping apparatus for pressing a cleaning tape made of one of a non-woven fabric and a fabric impregnated with a cleaning agent against said surface of said polymeric film for wiping off foreign matter adhering to said surface of said polymeric film;

a drying apparatus for drying said surface of said polymeric film; and a coating apparatus for applying a coating of a magnetic material to the surface of the running polymeric film, wherein the drying apparatus is closely positioned to the wiping apparatus, and the coating apparatus is closely positioned to the drying apparatus.

DETAILED DESCRIPTION OF THE INVENTION

Figure 1:
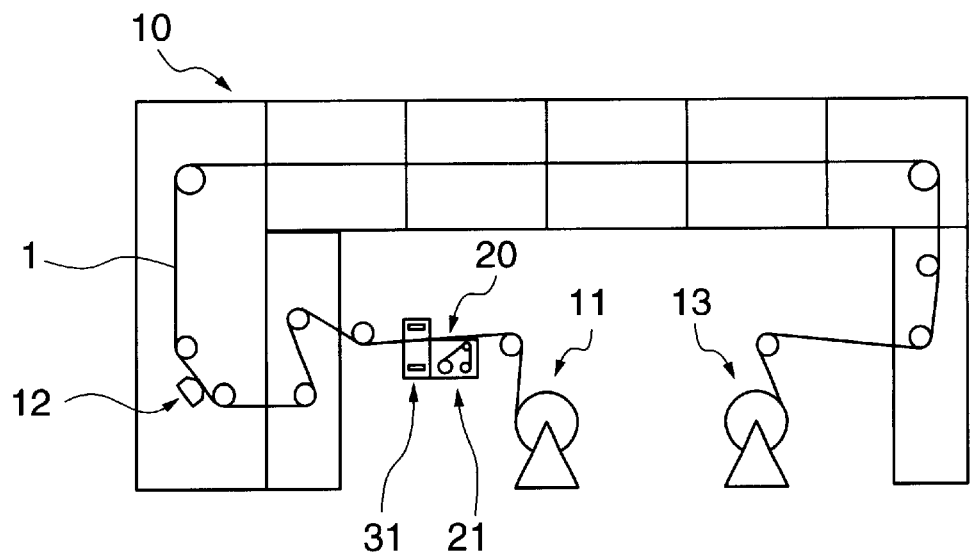
FIG. 1 is a schematic view showing an example of an apparatus for producing a magnetic recording medium.

FIG. 1 shows a magnetic recording medium producing apparatus 10, wherein a polymeric film 1 unwound from an unwinding apparatus 11 is passed through a coating apparatus 12. In the coating apparatus 12, a magnetic coating material is coated onto the surface of the polymeric film 1, and thereafter the polymeric film 1 is wound up by a winding apparatus 13.

Figure 2:
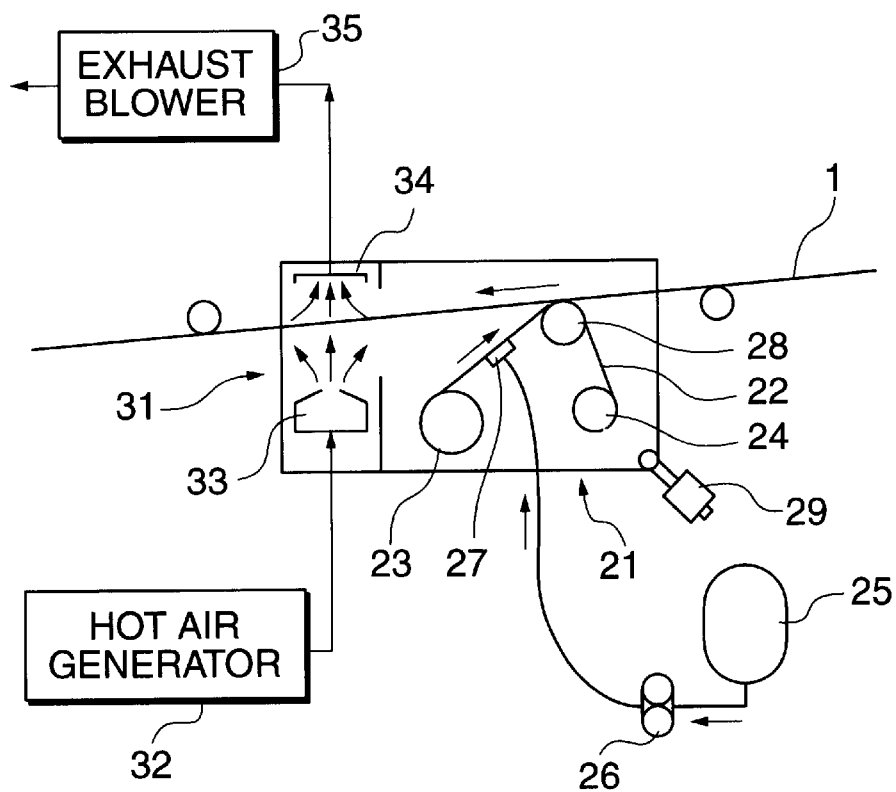
FIG. 2 is a schematic view showing an example of a cleaning apparatus.

In this magnetic recording medium producing apparatus 10, a cleaning apparatus 20 is disposed between the unwinding apparatus 11 and the coating apparatus 12. FIG. 2 shows a schematic view of an example of the cleaning apparatus 20, which is composed of a wiping apparatus 21 and a drying apparatus 31. In the wiping apparatus 21, a cleaning tape 22 made of a non-woven fabric or a fabric impregnated with a cleaning agent is pressed against the surface of the running polymeric film 1 unwound from the unwinding apparatus 11 upstream of the point where a magnetic coating material is coated onto the surface of the film, whereby foreign matter adhering to the surface of the film 1 is removed by wiping. In the drying apparatus 31, the surface of the polymeric film 1 wiped by the wiping apparatus 21 is dried to remove any cleaning agent remaining on the surface of the polymeric film 1. Subsequently, in the coating apparatus 12, the magnetic coating material is coated onto the surface of the polymeric film 1 cleaned by the cleaning apparatus 20.

The wiping apparatus 21 and the drying apparatus 31 will now be explained in detail.

As shown in FIG. 2, in the wiping apparatus 21 the cleaning tape 22 is unwound from an unwinding reel 23 at a specified rate (about 10 mm/min to 180 mm/min) and wound by a winding reel 24. A cleaning agent is supplied to the cleaning tape 22 from a cleaning agent supplying head 27 through a pump 26 connected to a cleaning agent tank 25 at a predetermined flow rate (10 ml/min to 100 ml/min). The cleaning tape 22 impregnated with the supplied cleaning agent is pressed against the polymeric film 1 by a pressing roll 28 to wipe the film and thereby to remove any foreign matter adhering to the surface of the polymeric film 1, and the used tape is then wound up by a winding reel 24. The contact pressure of the cleaning tape 22 against the polymeric film 1 can be arbitrarily controlled by an air cylinder 29. The moving direction of the cleaning tape 22 is, as shown in FIG. 2, is opposite to the running direction of the polymeric film 1 in the contact region with the polymeric film 1 where the cleaning tape is pressed against the polymeric film 1 by a pressing roll 28.

Figure 3A:
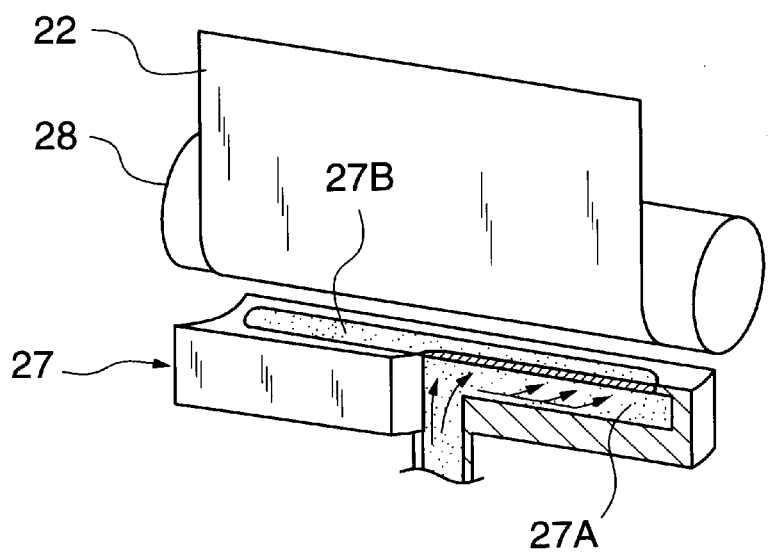
FIGS. 3A, 3B and 3C are schematic views.
Figure 3B:
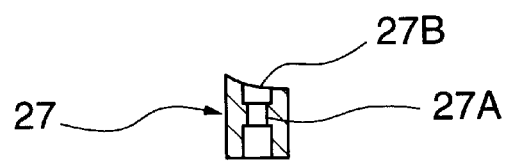
Figure 3C:
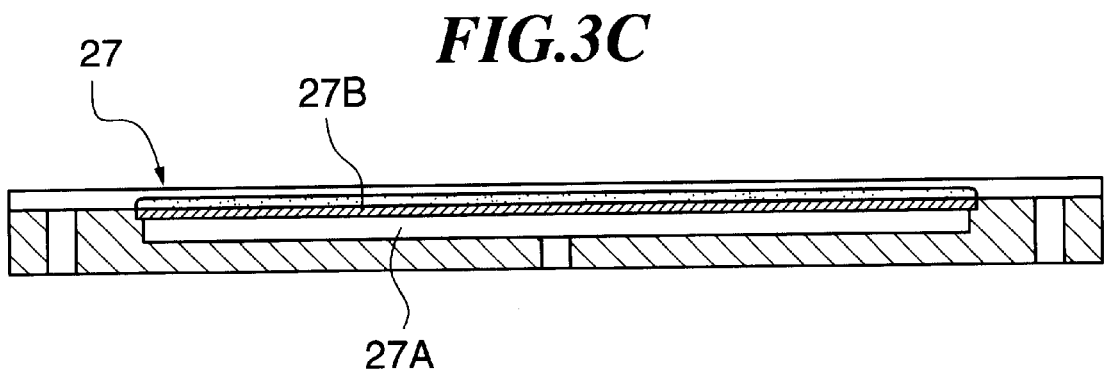

The cleaning agent supplying head 27 includes, as shown in FIG. 3, a cleaning agent distributing chamber 27 extending in the widthwise direction of the cleaning tape 22 and a porous plate 27B made of a fluorocarbon resin disposed at the front surface of the distributing chamber 27A. Cleaning agent oozed from the porous plate 27B is supplied to impregnate the cleaning tape 22 therewith.

For the cleaning agent supplied to the cleaning tape 22, water and an organic solvent are used. More specifically, (1) pure water, (2) hydrocarbons such as toluene, cyclohexanone, etc., (3) chlorinated hydrocarbons such as methylene chloride, etc., (4) alcohols such as ethanol, etc., (5) ethers such as dioxane, etc., (6) ketones such as methyl ethyl ketone, etc., (7) esters such as ethyl acetate, etc., or (8), chlorinated fluorohydrocarbons such as tetrachloroethane, difluoroethane, etc., can be employed.

As shown in FIG. 2, in the drying apparatus 31, a predetermined flow rate of hot air generated by a hot air generating apparatus 32 is supplied to the polymeric film 1 from a hot air blowing nozzle 33, and the hot air surrounding the polymeric film 1 is exhausted by an exhaust blower 35 through a hot air blowing nozzle 34. The volume of hot air supplied by the hot air generating apparatus 32 depends upon the running rate of the polymeric film 1, but it is suitable that the temperature of the air is from about 20° C. to 60° C. and that the air flow rate is from 5 m/sec to 25 m/sec.

According to the present invention, the following advantageous effects are obtained:

(1) The cleaning agent impregnated in the cleaning tape 22 makes it easy to separate foreign matter from the surface of the polymeric film 1, and the foreign matter is easily wiped off with the cleaning tape 22. When using the cleaning tape, there is no risk of damage to the polymeric film 1 as can occur when using a doctor blade, yet foreign matter strongly adhering to the polymeric film 1 can be surely removed.

(2) Residual cleaning agent remaining on the surface of the polymeric film 1 after removal of foreign matter from the surface of the polymeric film 1 is fully removed in the drying step carried out thereafter, so that no cleaning agent remains which could re-absorb dust, etc., from the air.

(3) The above-described steps of wiping off foreign matter and drying are carried out immediately before coating a magnetic coating material onto the polymeric film 1. Accordingly, the magnetic coating material can be coated onto the polymeric film 1 while the latter is in a clean state having no foreign matter adhered thereto, so that a coated film of consistently good quality is obtained.

What is claimed is:

1. A method for producing a magnetic recording medium having a magnetic material coated on a surface of a polymeric film comprising, in the running direction of the polymeric film, the steps of:

pressing a cleaning tape made of one of a non-woven fabric and a fabric, said cleaning tape being impregnated with a liquid cleaning agent, against the surface of said polymeric film onto which said coating material is to be subsequently coated in order to wipe off foreign matter adhering to said surface of the polymeric film;

drying the surface of the wiped polymeric film; and just after the drying step, coating a magnetic coating material onto a surface of a polymeric film while said polymeric film is running.

2. The method for producing a magnetic recording medium as claimed in claim 1, wherein said cleaning agent is at least one agent selected from the group consisting of pure water, hydrocarbons, chlorinated hydrocarbons, alcohols, ethers, ketones, esters, and chlorinated fluorohydrocarbons.

3. The method for producing a magnetic recording medium as claimed in claim 1, wherein said cleaning agent comprises at least one agent selected from the group consisting of pure water, toluene, cyclohexanone, methylene chloride, ethanol, dioxane, methyl ethyl ketone, ethyl acetate, tetrachloroethane, and difluoroethane.

4. The method for producing a magnetic recording medium as claimed in claim 1, further comprising the step of running said cleaning tape at a region of contact between said cleaning tape and said surface of said polymeric film in a direction opposite to a running direction of said film.

5. The method for producing a magnetic tape as claimed in claim 4, further comprising the steps of:

providing a supply of said cleaning agent in a cleaning agent tank;

supplying said cleaning agent from said cleaning agent tank to a cleaning agent supplying head having a distribution chamber extending in the widthwise direction of said cleaning tape covered by a porous plate; and oozing cleaning agent from said tank through said porous plate onto said fabric.

6. The method for producing a magnetic tape as claimed in claim 5, wherein a flow rate of said cleaning agent from said tank to said cleaning agent supplying head is in a range of 10 ml/min to 100 ml/min.

7. The method for producing a magnetic recording medium as claimed in claim 1, wherein said step of drying comprises blowing hot air against said polymeric film at a temperature in a range of 20° C. to 60° and at a flow rate in a range of 5 m/sec to 25 m/sec.

8. The method for producing a magnetic recording medium as claimed in claim 1, further comprising the step of controlling a contact pressure between said cleaning tape and said polymeric film with an air cylinder.

9. The method for producing a magnetic recording medium as claimed in claim 1, wherein a cleaning tape is made of a non-woven fabric.

10. The method for producing a magnetic recording medium of claim 1, wherein said magnetic recording medium is a magnetic recording tape.

* * * * *